May 4, 1926.

E. W. SPLITTSTOSER

SPRAYER

Filed Dec. 26, 1922

Inventor
Ernest W. Splittstoser
By his Attorneys
Merchant and Kilgore

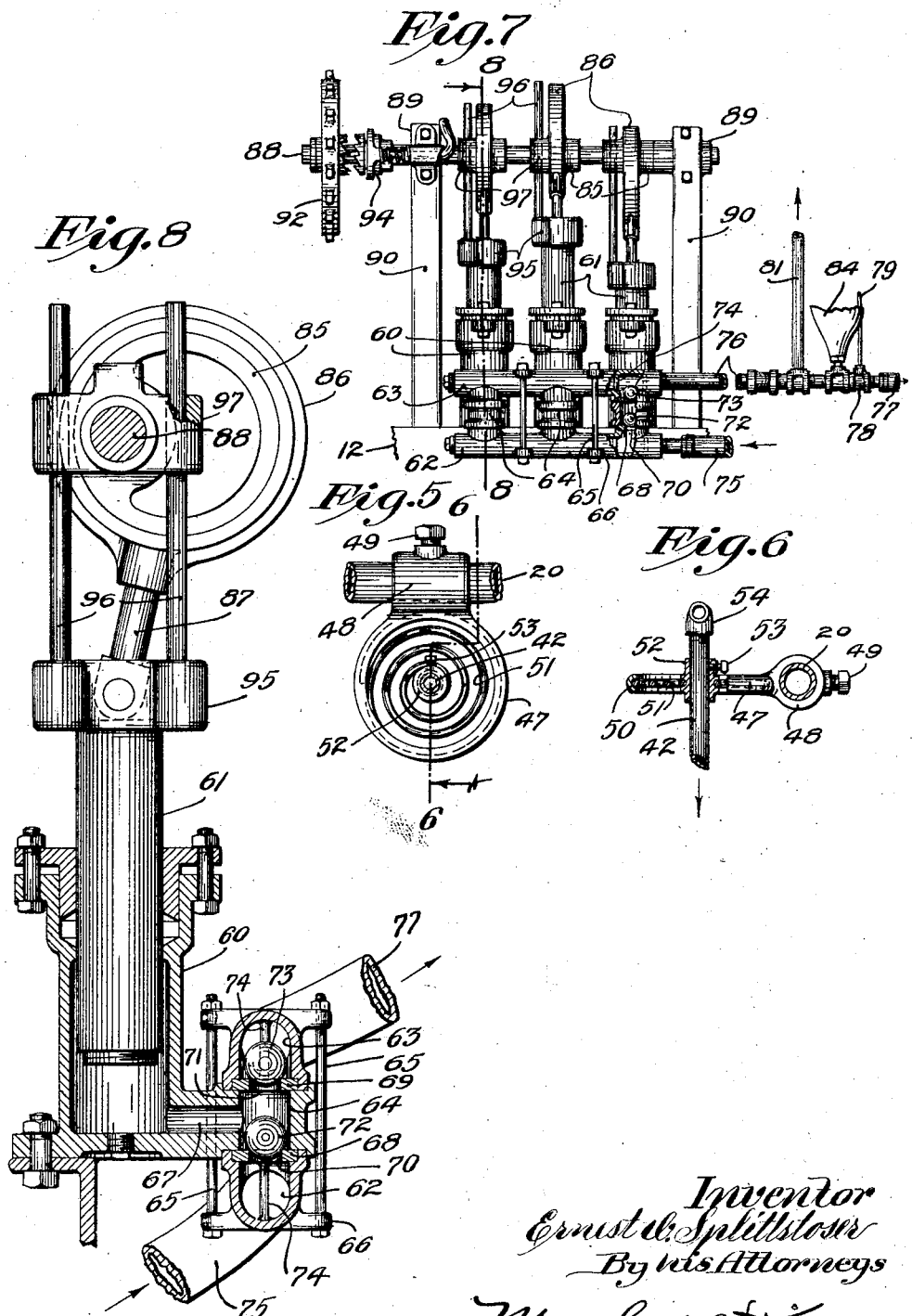

Patented May 4, 1926.

1,583,619

UNITED STATES PATENT OFFICE.

ERNEST W. SPLITTSTOSER, OF NORTH BRANCH, MINNESOTA, ASSIGNOR TO THE SPLITTSTOSER COMPANY, OF NORTH BRANCH, MINNESOTA, A CORPORATION OF MINNESOTA.

SPRAYER.

Application filed December 26, 1922. Serial No. 608,903.

*To all whom it may concern:*

Be it known that I, ERNEST W. SPLITTSTOSER, a citizen of the United States, residing at North Branch, in the county of Chisago and State of Minnesota, have invented certain new and useful Improvements in Sprayers; and I do hereby declare the following to be a full, clear, and exact description of the invention, such as will enable others skilled in the art to which it appertains to make and use the same.

My invention relates to sprayers, and more particularly to sprayers of the type used for spraying field crops, and has for its object to improve the same in the several particulars hereinafter noted.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 5 is a view corresponding to Fig. 4 but showing another form of the sprayer pipe guide, on an enlarged scale;

Fig. 6 is a detail view principally in section, taken on the irregular line 6—6 of Fig. 5;

Fig. 7 is an elevation of the pump, on an enlarged scale, with some parts broken away and sectioned; and Fig. 8 is a view principally in vertical section taken on the line 8—8 of Fig. 7, on an enlarged scale.

Figure 1:
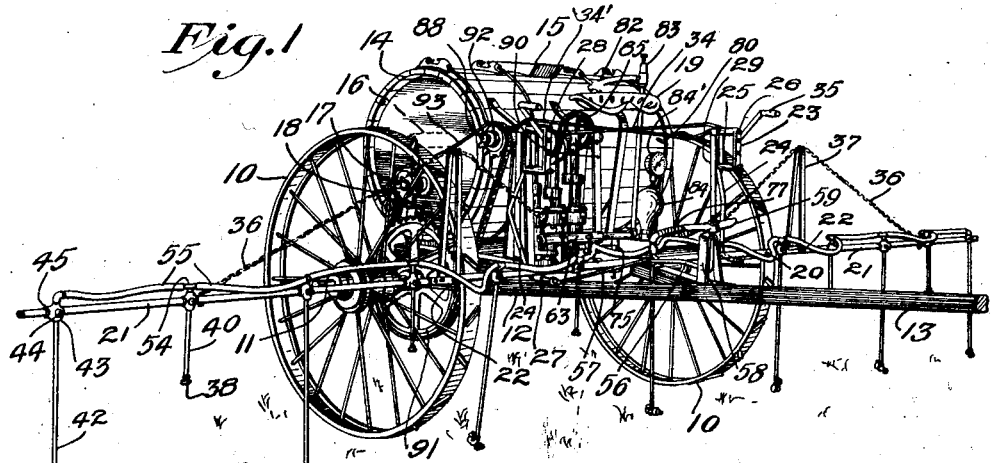
Fig. 1 is a perspective view of the improved sprayer.

The numeral 10 indicates a pair of wheels loosely journaled on an axle 11 which supports a frame 12 having a tongue 13 to which draft animals may be attached. Mounted on the frame 12 is a barrel 14 for holding the spraying liquid, and which barrel is horizontally disposed with its axis parallel to the axis of the axle 11. At the top of the barrel 14 is a normally closed filling opening 15, and in said barrel is an agitator 16 indicated only by broken lines except its shaft 17, to which is keyed a sprocket wheel 18. Secured to the frame 12, forward of the barrel 14, is a seat 19 for the operator of the sprayer.

Forward of the seat 19 is a transverse floating boom comprising an intermediate relatively fixed section 20 and end extensions or wing sections 21 pivoted at 22, one to each end of said intermediate section. The boom 20 and 21 is held suspended with freedom for raising and lowering movements as well as for endwise movements by a pair of toggles, each comprising an upper link 23 and a lower link 24, the former of which is made up of a pair of laterally spaced plates rigidly connected at their ends by tubes which afford inner and outer bearings 25 and 26, respectively. The ends of the links 24 are bent laterally to afford trunnions, the upper of which are mounted in the bearings 25 and afford the pivotal connections between the links of the toggle, and the lower of which trunnions are mounted in bearings 27 rigidly secured to the under side of the boom section 20.

The upper toggle links 23 are pivoted for swinging movement transversely of the machine on trunnions 28 formed with the upper ends of standards 29. These standards 29 are mounted in bearings 30 on the frame 12 with freedom for vertical adjustment and are held by set screws 31 in different adjustments. Rigidly secured to the upper end of each toggle link 23 is a pair of oppositely and horizontally extended cranks 33. These cranks 33 are cross connected by connecting rods 34, each of which is attached to the outer crank on one toggle 23 and to the inner crank on the other toggle link 23. Normally, the toggles 23—24 are straight, and to buckle the same and thereby lift the boom 20—21, there is secured to each toggle link 23 a crank-like handle 35.

To hold the wing sections 21 of the boom aligned with the intermediate section 20 thereof, there is provided for each of said wing sections a truss in the form of a chain 36 and a strut 37. Both chains 36 have one of their ends anchored to the boom section 20 and the other ends thereof are anchored, one to each wing section 21. The struts 37, which are in the form of yokes, have their legs secured to the pivot 22 for folding movement onto the boom section 20. The intermediate portions of the chains 36 extend over the intermediate portion of the strut 37 and are permanently secured thereto. By forming the trusses of flexible members and pivotally mounting their struts, the wing sections 21 of the boom may be folded into inoperative positions onto the intermediate boom section 20 together with said struts. The operator, by drawing even one of the cranks 35 inward, may buckle the toggles 23 and 24 and thereby raise the boom, and it is important to note that the toggle links 24 are bent outward so as to extend, when the toggles are buckled, over and inward of the trunnions 28, or in other words beyond dead centers, and thereby hold the toggles buckled with the boom in an inoperative position. It will also be noted that the end portions of the connecting rods 34 are reversely bent to clear the trunnions 28 during the buckling and straightening movements of the toggles.

Carried by each section of the boom is a plurality of relatively high and low nozzles 38 and 39, respectively, alternately arranged, the former of which are arranged to throw a downward spray, and the latter of which are arranged in pairs and arranged to throw two sprays upwardly and outwardly away from each other, or in other words, toward the sprays from the nozzles 38. The nozzles 38 are attached to the lower ends of relatively short sprayer pipes 40, and each pair of nozzles 39 is secured to a T-head 41, which in turn is secured to the lower end of a relatively long sprayer pipe 42. The nozzles 39 are attached to the T-heads 41 by screw threads so that they may be angularly adjusted to change the inclination of the sprays discharged therefrom.

Figure 2:
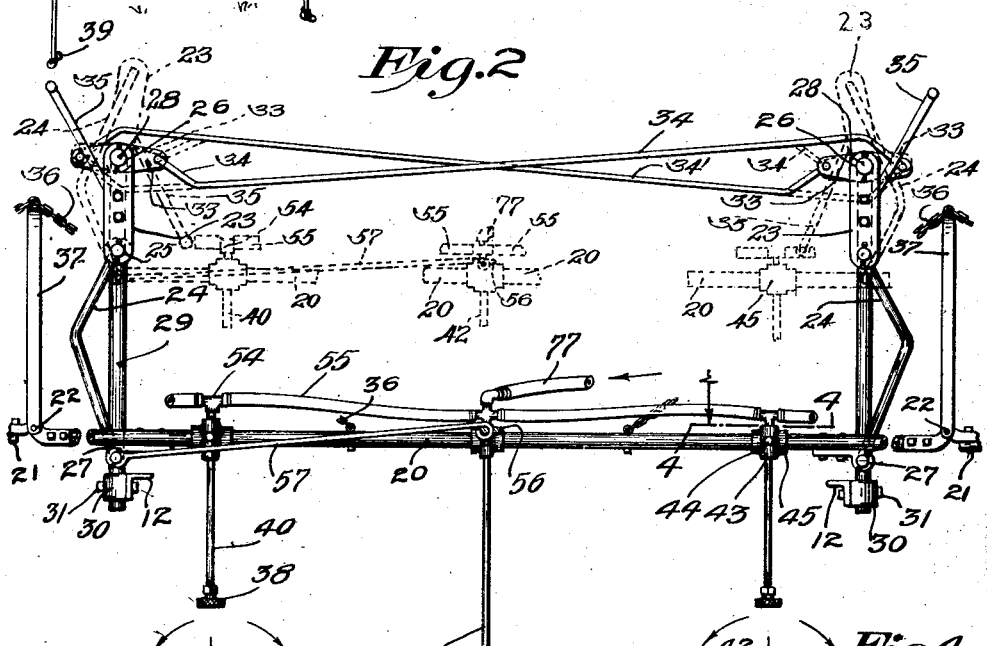
Fig. 2 is a fragmentary front elevation of the sprayer boom and nozzle.
Figures 3, 4:
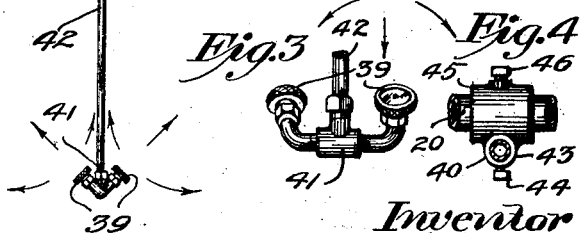
Fig. 3 is a detail view of one of the double nozzles.
Fig. 4 is a detail view of one of the sprayer pipe guides with the respective sprayer pipe sectioned on the line 4—4 of Fig. 2.

The sprayer pipes 40 and 42 are mounted in sleeve-like pipe holders 43 with freedom for vertical adjustment and held by a set screw 44. These pipe holders 43 are provided with sleeve-like bearings 45 mounted on the boom sections 20 and 21 with freedom for endwise adjustment to vary the spacing between the sprayer pipes 40 and 42 and are held by set screws 46, as best shown in Fig. 4. The sprayer pipe holders just described are shown in Figs. 1, 2 and 4.

In Figs. 5 and 6 there is shown a modification of the sprayer pipe holder which is provided with a yielding member that will permit the respective sprayer pipe and its nozzle or nozzles to move in any direction, in case the same strikes an obstruction such as a rock or stone, without damaging the machine. This sprayer pipe holder comprises an annular member 47 with which is formed a sleeve-like bearing 48 adjustably mounted on the boom section 20 and held by a set screw 49. The guide member 47 is provided with an internal groove 50 in which is mounted the outer convolution of a spiral spring 51, and having rigidly secured to its inner convolution a hub 52 in which is mounted one of the sprayer pipes 42 with freedom for endwise movement, but held by a set screw 53.

On the upper end of each sprayer pipe 40 and 42 is a T-head 54, and which T-heads are connected by hose connections 55 which form a continuous supply conduit leading to all of the sprayer pipes 40 and 42.

To endwise move the boom 20—21 and thereby position the sprayer pipes and nozzles between the rows of the crop, there is provided a lever arm 56 with a right-angular extension, the long arm being connected to the lower trunnion of link 24 by a connecting rod 57, and the extension being turned upward and pivotally mounted in a bracket 58 secured to the frame 12. A pair of oppositely extended foot rests 59 are secured to the upward extension above the bearing bracket 58 and by which foot rests the operator may impart to the lever arm 56 a swinging movement transversely of the machine to endwise move the boom.

The spraying liquid in the barrel 14 is delivered to the sprayer pipes 40 and 42 and hence to the nozzles through the conduit 54—55 under the desired pressure by a triplex pump comprising cylinders 60 and cooperating pistons 61. In connection with the pump cylinders 60 are intake and discharge headers 62 and 63, respectively, connected at each of said cylinders by a short pipe 64. The two headers 62 and 63 are connected and clamped onto the pipes 64, which are interposed therebetween, by long nut-equipped bolts 65 which extend through perforated ears 66 formed with said headers and arranged in pairs which extend from opposite sides thereof. Each pump cylinder 60 is connected by a passage-way 67 to the respective pipe 64.

Removably mounted in seats formed in the headers 62 and 63 and held in position by the ends of the pipes 64 are disc-like valve seats 68 and 69, respectively, having ports 70 and 71, respectively, which afford communication from the intake header 62 to the discharge header 63 through the pipes 64. The ports 70 and 71 are normally closed by ball check valves 72 and 73, respectively, which rest on the valve seats 68 and 69. Formed in each header 62 and 63 is a web 74. The headers 62 and 63, pipes 64, valve seats 68 and 69, and check valves 72 and 73 are interchangeably usable, and the web 74 in the header 63 prevents the valve 73 from rolling therein and away from the valve seat 69. The valve seats 68 and 69 may also be inverted and the under side used as a valve seat when the upper side thereof becomes worn.

The intake header 62 is connected to the barrel 14 at the bottom thereof, by a hose 75, and the discharge header 63 is provided with a pipe extension 76 which is connected to the central T-head 54 on the boom section 20 by a hose 77. Interposed in the pipe extension 76 is a cut-off valve 78 having an operating stem 79, the upper end of which is provided with a handle 80 by which it may be turned. Also interposed in the pipe extension 76 between the header 63 and cut-off valve 78 is an upright liquid return pipe 81, to the upper ends of which is attached a hose 82 which is arranged to discharge into the barrel 14 above the liquid level. The liquid return pipe 81 is normally closed by a cut-off valve 83. An air pressure equalizing dome 84, equipped with a pressure gauge 84', is attached to the pipe extension 76 between the valve 78 and liquid return pipe 81.

The pistons 61 are operated by eccentrics 85, the straps 86 of which have connecting rods 87 pivotally connected to said pistons. The eccentrics 85 are set on thirds and mounted on a shaft 88 journaled in bearings 89 on the upper ends of a pair of uprights 90 secured to the frame 12.

The following connections are provided for driving the shaft 88 and the agitator 16 from one of the wheels 10. Secured for rotation with the right-hand wheel 10 is a large sprocket wheel 91, and loosely mounted on the shaft 88 is a relatively small sprocket wheel 92. The sprocket wheels 91 and 92 are aligned with the sprocket wheel 18 on the shaft 17 of the agitator 16. A sprocket chain 93 is arranged to run over the aligned sprocket wheels 17, 91 and 92. A clutch 94 is provided for connecting the shaft 88 to the sprocket wheel 92, at will.

To guide the pistons 61 for true axial movement in respect to the cylinders 60, there is secured to the upper end of each of said pistons a cross head 95 having a pair of guide rods 96 which work in seats in a cross head guide 97 mounted on the shaft 88.

During the travel of the sprayer, the agitator 16 keeps the liquid in the barrel 14 thoroughly mixed. This liquid is sprayed from the nozzles 38 onto the tops of the plants, and the nozzles 39, which are arranged to pass between the rows, spray the liquid onto the plants and the under sides of their leaves. As previously stated, the nozzles 38 may be angularly adjusted so as to thoroughly spray plants of different heights, and the sprayer pipes 40 and 42 may be independently vertically adjusted to pass over plants of different heights and between plants of different sizes. When turning the sprayer at the end of rows, the operator will pull one of the handles 35 toward himself and thereby buckle the toggles 23 and 24 to lift the boom so that the nozzles 38 and 39 will pass freely over the plants, or the same operation may take place to cause the nozzles to clear a stone, stump or other obstruction. In case the sprayer does not start at the beginning of the rows with the nozzles 38 properly positioned over the plants and with the nozzles 39 between the rows, the operator, by manipulating the foot rest 59, may endwise move the boom and thus hold the nozzles in their proper relation to the plants until the sprayer is brought into line.

When the sprayer is not in use, or travelling through a gate opening or along the highway, the boom wings 21 may be folded onto the boom section 20, as previously described, and thereby materially reduce the width of the sprayer.

The above described sprayer has, in actual commercial use, proven highly efficient for the purpose had in view.

What I claim is:

1. In a sprayer of the kind described having a vertically and endwise adjustable horizontally disposed boom, spraying nozzles carried by the boom, and foot-controlled means for endwise adjusting the boom.

2. In a sprayer of the kind described having a transversely extended horizontally disposed boom, depending spraying nozzles on the boom, suspending means for loosely holding the boom for endwise swinging movement in either direction from normal position, and foot-controlled means for endwise moving the boom.

3. In a sprayer of the kind described having a horizontally disposed boom, said boom having a wing extension foldably connected thereto, and a collapsible truss for holding the wing extension substantially aligned with the boom.

4. In a sprayer of the kind described having a pair of vertically disposed normally straight toggles, relatively fixed supports to which the upper links of the toggles are pivoted, a boom pivotally supported from the lower links of the toggles, spraying nozzles carried by the boom, and means for buckling the toggles to raise the boom.

5. The structure defined in claim 4 in which the upper links of the toggles are cross connected for common movement.

6. The structure defined in claim 4 in further combination with means for connecting the upper links of the toggles for common movement.

7. The structure defined in claim 4 in further combination with means for connecting the upper links of the toggles for common movement, and a crank-acting handle applied to the upper link of at least one of the toggles.

8. The structure defined in claim 4 in which the toggles when buckled are beyond dead centers for holding the boom raised.

9. The structure defined in claim 4 in which the relatively fixed supports are vertically adjustable.

10. In a sprayer of the kind described having a horizontally disposed boom, axially adjustable sprayer guides on the boom, sprayer pipes vertically adjustable in said guides, spraying nozzles on the sprayer pipes, and a liquid supply conduit leading to the sprayer pipes, said sprayer pipe guides having means for yieldingly holding the sprayer pipes to permit movements in substantially all directions.

11. The structure defined in claim 2 in which said suspending means, when operated to lift the boom into its uppermost position, is self-locking to thus hold said boom.

12. In a sprayer of the kind described having a pair of vertically disposed normally straight toggles, relatively fixed supports to which the upper links of the toggles are pivoted, a boom pivotally supported from the lower links of the toggles, for raising and lowering movements and for endwise movement, spraying nozzles carried by the boom, means including a lever for endwise moving the boom and for holding the same in different endwise adjustments, and means for buckling the toggles to raise and lower the boom.

13. In a sprayer of the kind described having a pair of vertically disposed normally straight toggles, relatively fixed supports to which the upper links of the toggles are pivoted, a boom pivotally supported from the lower links of the toggles for raising and lowering movements and for endwise movement, spraying nozzles carried by the boom, means including a lever for endwise moving the boom and for holding the same in different endwise adjustments, a pair of crossed rods connecting the upper links of the toggles, and means for buckling the toggles to raise and lower the boom.

14. In a sprayer of the kind described having a pair of vertically disposed normally straight toggles, relatively fixed supports to which the upper links of the toggles are pivoted, a boom pivotally supported from the lower links of the toggles for raising and lowering movements and for endwise movement, spraying nozzles carried by the boom, means including a lever for endwise moving the boom and for holding the same in different endwise adjustments, cranks on the upper links of the toggles, means connecting said cranks, and means for buckling the toggles to raise and lower the boom.

15. In a sprayer of the kind described having a pair of vertically disposed normally straight toggles, relatively fixed supports to which the upper links of the toggles are pivoted, a boom pivotally supported from the lower links of the toggles for raising and lowering movements and for endwise movement, spraying nozzles carried by the boom, means including a lever for endwise moving the boom and for holding the same in different endwise adjustments, a pair of oppositely extended cranks on each of the upper links of the toggles, a pair of crossed rods connecting the cranks on the upper links of the toggles, and means for buckling the toggles to raise and lower the boom.

16. The structure defined in claim 15 in further combination with a crank-acting handle applied to the upper link of one of the toggles.

17. In a sprayer of the kind described having a holder, a spiral spring having its outer convolution secured to said holder, and a nozzle-equipped pipe extending through the inner convolution of said spring and secured thereto.

In testimony whereof I affix my signature.

ERNEST W. SPLITTSTOSER.